United States Patent
Issa et al.

(10) Patent No.: US 8,811,805 B2
(45) Date of Patent: *Aug. 19, 2014

(54) SYSTEM AND METHOD FOR DISTRIBUTED TRICK PLAY RESOLUTION USING USER PREFERENCES

(71) Applicant: Porto Technology, LLC, Wilmington, DE (US)

(72) Inventors: Alfredo C. Issa, Apex, NC (US); Richard J. Walsh, Raleigh, NC (US); Kunal Kandekar, Jersey City, NJ (US)

(73) Assignee: Porto Technology, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/713,651

(22) Filed: Dec. 13, 2012

(65) Prior Publication Data

US 2013/0223821 A1    Aug. 29, 2013

Related U.S. Application Data

(63) Continuation of application No. 12/656,529, filed on Feb. 2, 2010, now Pat. No. 8,346,067.

(60) Provisional application No. 61/149,220, filed on Feb. 2, 2009.

(51) Int. Cl.
*H04N 5/783* (2006.01)

(52) U.S. Cl.
USPC ............................................. 386/343

(58) Field of Classification Search
None
See application file for complete search history.

(56) References Cited

U.S. PATENT DOCUMENTS

| | | |
|---|---|---|
| 4,605,964 A | 8/1986 | Chard |
| 5,640,193 A | 6/1997 | Wellner |
| 5,687,275 A | 11/1997 | Lane et al. |
| 5,905,865 A | 5/1999 | Palmer et al. |
| 5,940,831 A | 8/1999 | Takano |
| 6,530,084 B1 | 3/2003 | Del Sesto et al. |
| 6,745,368 B1 | 6/2004 | Boucher et al. |
| 6,774,908 B2 | 8/2004 | Bates et al. |
| 6,907,570 B2 | 6/2005 | Amir et al. |
| 7,036,083 B1 | 4/2006 | Zenith |
| 7,149,411 B2 | 12/2006 | Jun et al. |
| 7,319,806 B1 | 1/2008 | Willner et al. |
| 7,356,830 B1 | 4/2008 | Dimitrova |
| 7,362,950 B2 | 4/2008 | Jun et al. |
| 7,802,278 B2 | 9/2010 | Kweon |
| 2002/0038383 A1 | 3/2002 | Ullman et al. |
| 2002/0069218 A1 | 6/2002 | Sull et al. |
| 2002/0194608 A1 | 12/2002 | Goldhor |
| 2003/0072556 A1 | 4/2003 | Okujima et al. |

(Continued)

OTHER PUBLICATIONS

Francisco-Revilla, Luis, "A Picture of Hypervideo Today," at <http://www.csdl.tamu.edu/~I0f0954/academic/cpsc610/p-1.htm>, 1998, printed Sep. 6, 2011, 15 pages.

(Continued)

*Primary Examiner* — William C Vaughn, Jr.
*Assistant Examiner* — Daniel Tekle

(57) ABSTRACT

Distributed trick play resolution in a distributed video viewing group network includes determining trick play preferences for each of a plurality of peer nodes in the distributed video viewing group network with respect to a video item. Conflicting trick play preferences between the peer nodes is determined based on one or more of a group consisting of: user rankings, user voting, trick play ranking, and owner resolution. The determined conflicting trick play preferences are resolved.

21 Claims, 11 Drawing Sheets

(56) References Cited

U.S. PATENT DOCUMENTS

| | | |
|---|---|---|
| 2003/0093790 A1 | 5/2003 | Logan et al. |
| 2003/0146940 A1 | 8/2003 | Ellis et al. |
| 2003/0152363 A1 | 8/2003 | Jeannin et al. |
| 2003/0177503 A1 | 9/2003 | Sull et al. |
| 2004/0034874 A1 | 2/2004 | Hord et al. |
| 2004/0098754 A1 | 5/2004 | Vella et al. |
| 2004/0189691 A1 | 9/2004 | Jojic et al. |
| 2004/0205087 A1 | 10/2004 | Dorsey et al. |
| 2004/0255336 A1 | 12/2004 | Logan et al. |
| 2005/0019006 A1 | 1/2005 | Suh et al. |
| 2005/0076359 A1 | 4/2005 | Pierson et al. |
| 2005/0125821 A1 | 6/2005 | Li et al. |
| 2005/0183120 A1 | 8/2005 | Jain et al. |
| 2005/0235318 A1 | 10/2005 | Grauch et al. |
| 2005/0283475 A1 | 12/2005 | Beranek et al. |
| 2006/0004704 A1 | 1/2006 | Gross |
| 2006/0015895 A1 | 1/2006 | Stone |
| 2006/0080167 A1 | 4/2006 | Chen et al. |
| 2006/0117357 A1 | 6/2006 | Surline |
| 2006/0161952 A1 | 7/2006 | Herz et al. |
| 2006/0168630 A1 | 7/2006 | Davies |
| 2006/0174293 A1 | 8/2006 | Ducheneaut et al. |
| 2006/0218602 A1 | 9/2006 | Sherer et al. |
| 2006/0271997 A1 | 11/2006 | Jacoby et al. |
| 2007/0033531 A1 | 2/2007 | Marsh |
| 2007/0094687 A1 | 4/2007 | Russell |
| 2007/0124795 A1 | 5/2007 | McKissick et al. |
| 2007/0127887 A1 | 6/2007 | Yap et al. |
| 2007/0143493 A1 | 6/2007 | Mullig et al. |
| 2007/0204287 A1 | 8/2007 | Conradt et al. |
| 2007/0204310 A1 | 8/2007 | Hua et al. |
| 2007/0219949 A1 | 9/2007 | Mekikian |
| 2007/0220552 A1 | 9/2007 | Juster et al. |
| 2007/0261095 A1 | 11/2007 | Petrisor et al. |
| 2007/0299870 A1 | 12/2007 | Finch |
| 2008/0065693 A1 | 3/2008 | Malik |
| 2008/0086456 A1 | 4/2008 | Rasanen et al. |
| 2008/0086688 A1 | 4/2008 | Chandratillake et al. |
| 2008/0092168 A1 | 4/2008 | Logan et al. |
| 2008/0109298 A1 | 5/2008 | Barton |
| 2008/0109750 A1 | 5/2008 | Lin-Hendel |
| 2008/0124052 A1 | 5/2008 | Sardera |
| 2008/0127268 A1 | 5/2008 | Bergeron et al. |
| 2008/0133736 A1 | 6/2008 | Wensley et al. |
| 2008/0140523 A1 | 6/2008 | Mahoney et al. |
| 2008/0147501 A1 | 6/2008 | Gilliam |
| 2008/0155461 A1 | 6/2008 | Ozaki |
| 2008/0155585 A1 | 6/2008 | Craner et al. |
| 2008/0212775 A1 | 9/2008 | Mirsky et al. |
| 2008/0281689 A1 | 11/2008 | Blinnikka et al. |
| 2009/0083809 A1 | 3/2009 | Hayashi et al. |
| 2009/0119166 A1 | 5/2009 | Taylor et al. |
| 2009/0180753 A1 | 7/2009 | Kitazato |
| 2009/0210300 A1 | 8/2009 | Cansler et al. |
| 2009/0288112 A1 | 11/2009 | Kandekar et al. |
| 2009/0288131 A1 | 11/2009 | Kandekar et al. |
| 2009/0292819 A1 | 11/2009 | Kandekar et al. |
| 2010/0077435 A1 | 3/2010 | Kandekar et al. |
| 2010/0195975 A1 | 8/2010 | Issa et al. |
| 2010/0199295 A1 | 8/2010 | Katpelly et al. |
| 2012/0039578 A1 | 2/2012 | Issa et al. |

OTHER PUBLICATIONS

Tsinaraki, C. et al., "A Video Metadata Model Supporting Personalization & Recommendation in Video-based Services," Proc. of MDDE Workshop (in conjunction with RETIS), Lyon, France, Jul. 2001, pp. 104-109, found at <http://citeseer.ist.psu.edu/viewdoc/summary?doi=10.1.1.104.3610>, 6 pages.

Pfeiffer, Silvia, "Architecture of a Video Web—Experience with Annodex," at <http://www.w3.org/2007/08/video/positions/annocex.pdf>, dated Nov. 21, 2007, Position Statement W3C Video Workshop, Dec. 12-13, 2007, San Jose, California and Brussels, Belgium, 5 pages.

"Asterpix Interactive Video—Frequently Asked Questions," at <http://www.video.asterpix.com/help>, found on the Internet Archive, dated May 13, 2009, appears to date back as early as Oct. 2007, printed May 13, 2011, 8 pages.

Iskrocki, "How to disable YouTube's new related videos feature," Jun. 7, 2007, at <http://blogs.oracle.com/Iskrocki/entry/how_to_disable_youtube_s>, printed Dec. 12, 2011, 6 pages.

"Hypermedia," at <http://en.wikipedia.org/wiki/Hypermedia>, page last modified May 9, 2011, printed May 13, 2011, 2 pages.

"Hypervideo," at <http://en.wikipedia.org/wiki/Hypervideo>, page last modified Apr. 13, 2011, printed May 13, 2011, 5 pages.

Weng, Chung-Yi et al., "Movie Analysis Based on Role's Social Network," In Proceedings of IEEE International Conference on Multimedia and Expo, Jul. 2-5, 2007, Beijing, China, pp. 1403 – 1406, found at <http://www.cmlab.csie.ntu.edu.tw/new_cml_website/media/publications/Weng-2007-MAB.pdf>, 4 pages.

PCT/US09/05089—International Search Report and Written Opinion.

Worring, Marcel and Snoek, Cees, "SAMT 2006—Semantic Indexing and Retrieval of Video," SAMT 2006 Conference in Athens, Greece, Dec. 6-8, 2006, 172 pages.

Bolle, R. M. et al, "Video query: Research directions," IBM Journal of Research and Development, vol. 42, Issue: 2, Digital Object Identifier: 10.1147/rd.422.0233, Publication Date: Mar. 1998, pp. 233-252, copyright 1998, IBM, 20 pages.

"What is Tribler?", found at <http://www.tribler.org/trac/wiki/whatIsTribler>, dated stated as "Last modified 3 years ago," with most history noted as being modified 3 or more years ago, visited and printed on Dec. 14, 2011, 2 pages.

Miller, Michael, "YouTube 4 You," Que, Apr. 26, 2007, pp. 10-15, 39-48, 52-56, 69-71, 128-129, and 153-155, 30 pages.

SYSTEM AND METHOD FOR DISTRIBUTED TRICK PLAY RESOLUTION USING USER PREFERENCES

CROSS REFERENCE TO RELATED APPLICATIONS

This application is a continuation of U.S. patent application Ser. No. 12/656,529, titled "SYSTEM AND METHOD FOR DISTRIBUTED TRICK PLAY RESOLUTION USING USER PREFERENCES", filed on Feb. 2, 2010, which claims priority from U.S. Provisional Application No. 61/149,220 filed on Feb. 2, 2009, the disclosure of each of which is incorporated herein by reference in its entirety.

FIELD OF THE INVENTION

The present invention relates generally to a media system and, more particularly, to distributed media experiences among multiple users.

BACKGROUND

In distributed video viewing systems, where a group of users are viewing videos in a peer-to-peer (P2P) or distributed computing model, users will inevitably want to use certain functions such as trick play functionality. However, the video is viewed in a group and also in distributed locations. Thus, the individual preferences of each user often conflict with that of the entire group of users when viewing a video in the P2P or distributed viewing setting.

SUMMARY

Systems and methods consistent with the present invention relate to resolving conflicting trick play preferences of each user versus the preferences of the entire group during playback of a media item such as, for example, a video.

Moreover, systems and methods consistent with the present invention provide trick play content resolution by providing techniques to manually and automatically resolve distributed trick play conflicts.

According to one aspect, the present invention provides a method of distributed trick play resolution in a distributed media group network, including: determining trick play preferences at each of a plurality of peer nodes in the distributed media group network with respect to a media item; and resolving conflicting trick play preferences between the peer nodes based on the determined trick play preferences.

In the method, the distributed media group network may include a distributed video viewing group network and the media item may be a video item.

According to another aspect of the present invention, a media system for trick play resolution in a video player is provided, including: means for determining trick play preferences at each of a plurality of peer nodes in the distributed video viewing group network with respect to a video item; and means for resolving conflicting trick play preferences between the peer nodes based on the determined trick play preferences.

The present invention also contemplates a computer readable medium including a program for instructing a distributed video viewing system to: examine a video item, which is to be viewed through the distributed video viewing system at individual peer nodes, segment by segment; determine preferences at each peer node for trick play operations with respect to each segment of the video item; map the segments of the video item to the preferences and algorithmically generate a map file of trick play functions which are permitted and denied for each segment of the video item; and share the map file upon request by the individual peer nodes or a central service.

The present invention also provides a media system for distributed trick play resolution in a distributed video viewing group network, including: a media player which plays back video content; a peer node connected to the media player and which determines trick play preferences and resolves conflicting trick play preferences with other peer nodes in the distributed video viewing group network based on the determined trick play preferences; and a display device which displays the video content.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION

The embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Note that at times the system of the present invention is described as performing a certain function. However, one of ordinary skill in the art would know that the program is what is performing the function rather than the entity of the system itself. Further, embodiments of the present invention can be implemented in software, hardware, or a combination thereof.

Although aspects of one implementation of the present invention are depicted as being stored in memory, one skilled in the art will appreciate that all or part of systems and methods consistent with the present invention may be stored on or read from other computer-readable media, such as secondary storage devices, like hard disks, floppy disks, and CD-ROM, or other forms of a read-only memory (ROM) or a random access memory (RAM) either currently known or later developed. Further, although specific components of the system have been described, one skilled in the art will appreciate that a system suitable for use with the methods and systems consistent with the present invention may contain additional or different components.

Figure 1:
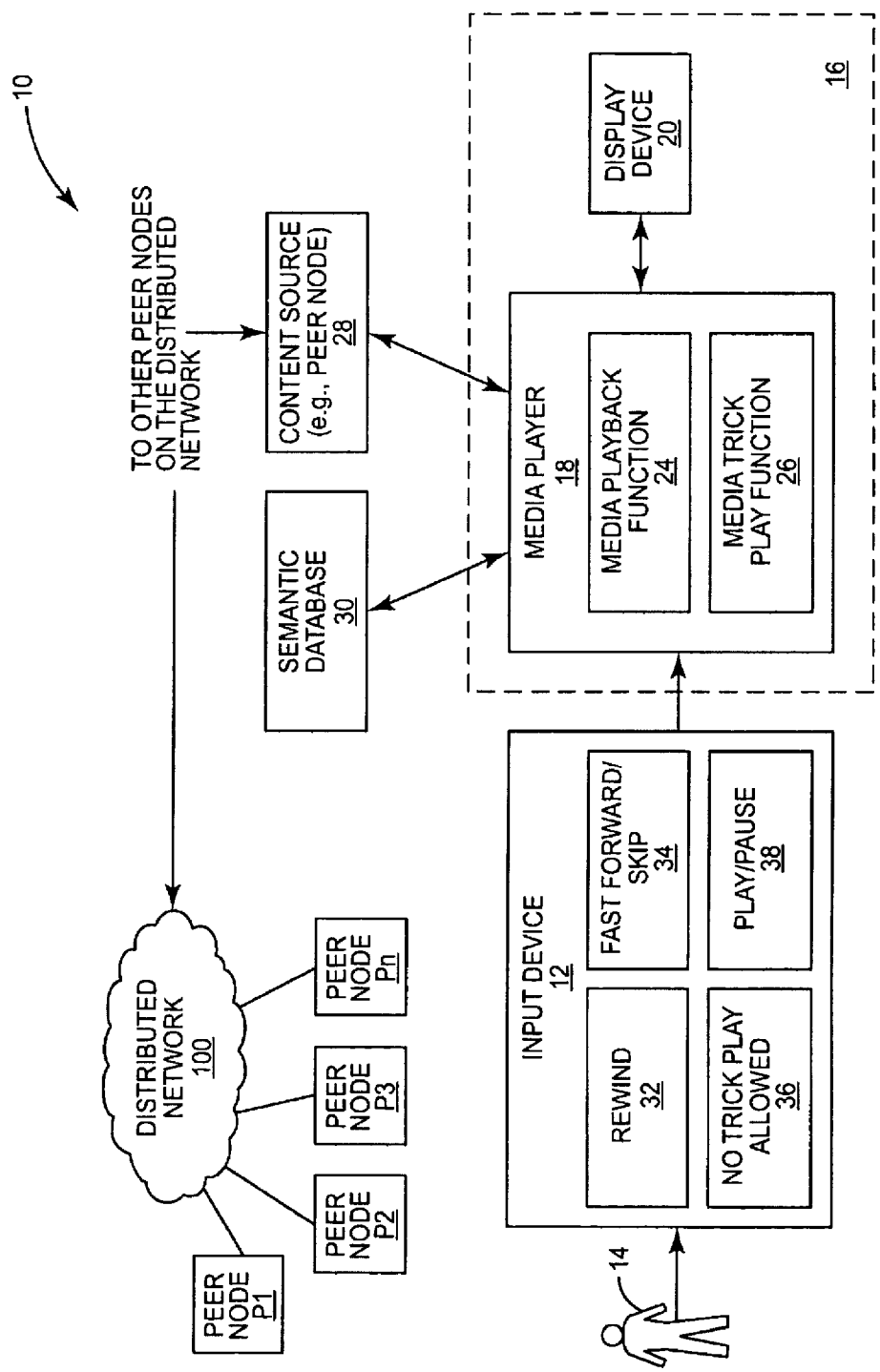
FIG. 1 illustrates a media system of an individual peer of a distributed video viewing group according to an exemplary embodiment of the present invention.

FIG. 1 illustrates a media system of an individual peer of a distributed video viewing group according to an exemplary embodiment of the present invention. In general, the media system for distributed trick play resolution 10 includes an input device 12, such as but not limited to a keyboard, keypad, or remote control for operation by an associated user 14, and a media playback system 16. In this exemplary embodiment, the media playback system 16 includes a media player 18 and a display device 20.

The media player 18 may be, for example, a personal computer, a set-top box (STB) for playing digital television content received from a television content provider, a Digital Video Recorder (DVR) for playing previously recorded video content such as previously recorded television content received from a television content provider, an Apple TV® device for playing downloaded content that has been purchased or rented from a remote media distribution service such as the Apple® iTunes® store, a Digital Versatile Disc (DVD) player, a mobile device, or the like. The media player 18 may be connected to the display device 20 via any desired audio/video connection such as, for example, a High Definition Multimedia Interface (HDMI) connection, a Digital Video Interface (DVI) connection, a coaxial cable connection, or the like. The display device 20 may be, for example, a computer display screen, a television (TV), or the like. In an alternative embodiment, the display device 20 may be incorporated into the media player 18.

The media player 18 includes a media playback function 24 and a media trick play function 26, each of which may be implemented in software, hardware, or a combination thereof. The media playback function 24 generally operates to provide playback of media items obtained from a content source such as a peer node 28 (or a server or combination thereof). As will be discussed in more detail below, the peer node 28 may be connected to other peer nodes P1, P2, P3, . . . Pn, or to a service, in a distributed video viewing group network 100. In the exemplary embodiment, the media items are video items. Other media items may include music playlists, online radio, etc. As such, the media playback function 24 provides playback of the video items and presentation of the video items to the user 14 via the display device 20. Although the peer node 28 is shown as a separate unit, it may be part of the media player 18.

The following is a more detailed description of the media system for distributed trick play resolution consistent with the present invention.

The term "trick play" as used herein generally refers to using the transport or viewing controls such as pause, instant replay, rewind, fast forward, skip, slow, etc., of the media player 18 (for example, a DVR system). As shown in FIG. 1, the input device 12 may include buttons for the various trick play functions, such as by way of example, rewind 32, fast forward/skip/"skip ahead 30 seconds" 34, play/pause 38, as well as a "no trick play allowed" function 36. These functions may also appear in a graphic user interface (GUI) on the display device 20 such that a user can click on them to control the various trick play functions.

Figure 2:
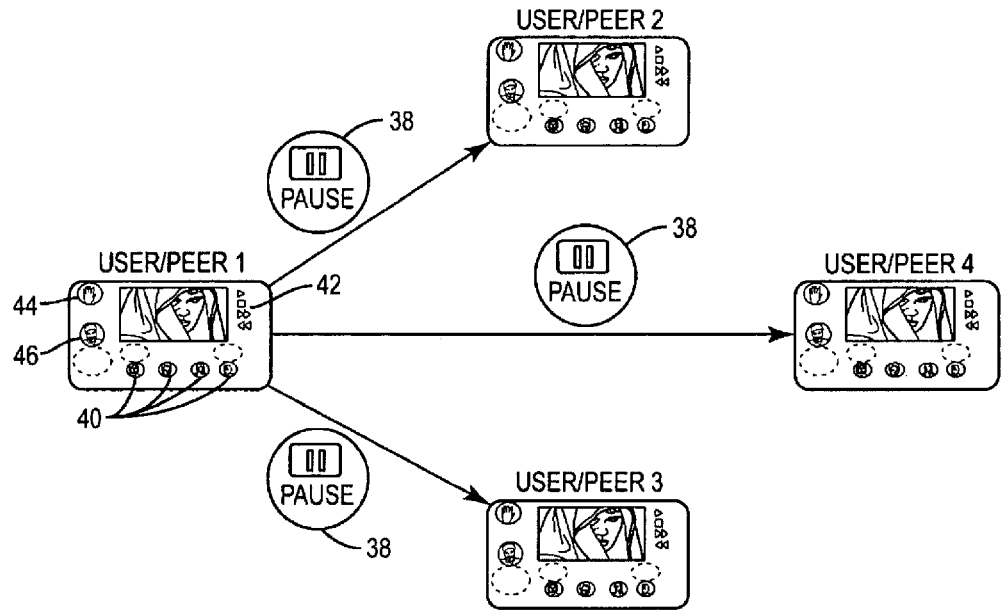
FIG. 2 depicts a broad overview of a distributed video viewing group according to an illustrative embodiment.

FIG. 2 shows a distributed video viewing group (four of which are shown as users/peers 1-4) in the process of watching a video. Each user's display may show a picture or icon 40 representing the various users/peers, trick play functions 42, an icon for the particular function (e.g., a hand 44 to indicate "pause"), and a picture or icon 46 representing the user invoking a trick play function. In this scenario, a particular user 46 wishes to invoke a trick play, such as pause 38, which will then cause that trick play message to be sent to all participants in order to keep viewing the video in a synchronized manner. Particular users or peers in the distributed video viewing group, though, may have preferences not to pause at that point in time, but may have no issue with pausing later in playback. As will be discussed in detail below, the present invention provides trick play content resolution by providing techniques to resolve distributed trick play conflicts.

Figure 3:
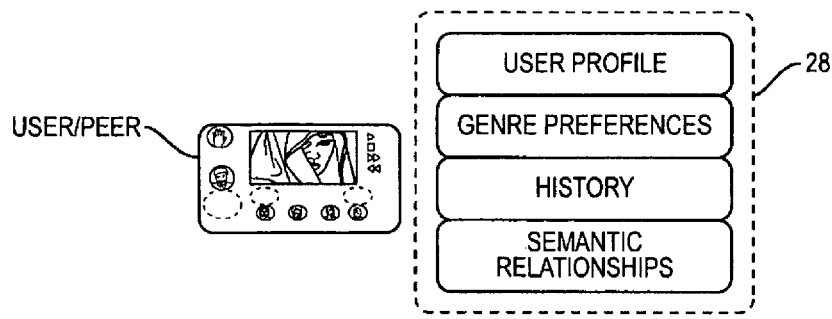
FIG. 3 depicts an illustrative embodiment of an individual peer of a distributed video viewing group and the content maintained thereby.

As shown in FIG. 3, each peer node 28 can maintain (or can store at a remote server, or distributed on a set of user devices such as a home personal video recorder (PVR), mobile devices, a tablet, etc.), but is not limited to, the following information on a corresponding user:

User profile: demographics and account information.

Genre Preferences: genres of content that the corresponding user prefers. The genre preferences can be very detailed—such as "Early black and white British mysteries," or very broad—such as "Science fiction."

History: content viewed, content skipped, content rewound.

Semantic Relationships: a cache of genres and content that is semantically relevant to the user's preferences.

The content cache is fetched from, for example, a semantic database 30 (see FIG. 1), which may be local, remote, centralized or distributed. In this regard, FIG. 1 shows the semantic database 30 as a local database which could also be part of the media player 18.

The content maintained by the peer node 28 is used to automatically generate a trick play preferences map for a piece of content which will be viewed on a distributed video viewing network such as a P2P network. The trick play preferences map can be generated before the content is viewed or sometime later upon request.

A mapping file can be generated using the following exemplary instruction:

For each video segment, use the peer stored user information and determine the user's preference for trick play operations. This instruction may be based on an algorithm, heuristic, or the like.

Mapping File Structure

A mapping file may simply be a data structure that identifies the user and also comprises one or more substructures for each scene, including:

1. Scene identification (ID) (e.g., start and end offsets); and

2. Trick play and other actions that are allowed, denied or do not matter to the user for the particular scene.

The scene IDs may be the same across all users, or may be different for different users (i.e., each user may have a unique set of scene start and end offsets, which may be created via scene analysis using each user's personal preferences, and the combined trick play preferences at any point may be determined by the segment of the map file corresponding to that video playback offset or video scene).

The Allow/Deny/Do not Care permissions for each scene may simply be set as flags for each type of trick play action, where 1=Allow, 0=Deny, X=Do not Care. The following Table shows the various permissions for a plurality of scenes:

TABLE

| Scene Start | 00 h 00 m 00 s | 00 h 01 m 41 s | 00 h 07 m 35 s | 00 h 13 m 23 s | ... | ... |
|---|---|---|---|---|---|---|
| Scene End | 00 h 01 m 40 s | 00 h 07 m 34 s | 00 h 13 m 22 s | 00 h 23 m 01 s | ... | ... |
| FF | 1 | 0 | 0 | 1 | ... | ... |
| RW | 0 | 0 | 0 | X | ... | ... |
| Pause | X | 0 | X | 1 | ... | ... |

Figure 4:
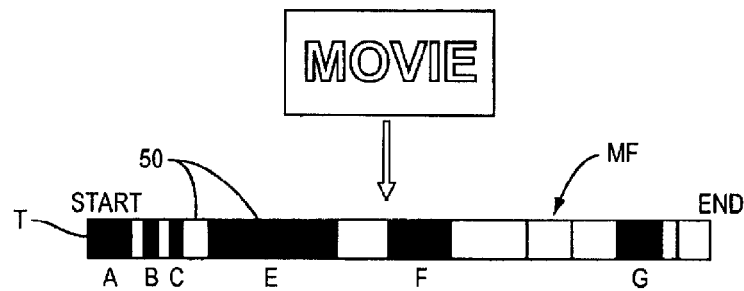
FIG. 4 depicts a sequence of blocks representing scenes along a video timeline according to an illustrative embodiment.

Such a data structure can be pictorially depicted as in FIG. 4 as a sequence of blocks 50 representing scenes along the video timeline T, with white and black colors of the blocks indicating whether (or which) trick play actions are allowed for the corresponding scenes. The map file (and the merged map file) may not necessarily contain trick play permission information (e.g., allow/deny/do not care for FF/RW/Pause, etc.) for each and every scene in the movie. Segments or scenes where the user has no trick play preferences may be excluded from the map file, with the implicit assumption that missing segments in the map file indicate a "don't care" preference (or any other default preference). So even though the table above shows information for all contiguous scenes, it could potentially be missing segments (columns) that contain no specific user preferences.

FIG. 4 shows an example mapping file MF for a user for a video (e.g., the movie Star Wars™). Certain segments have been blocked out for trick play operations, either for all trick play operations or for only certain ones. For example, block A may have been blocked because the user is a big Darth Vader fan, and that character plays a significant role in the segments covered by block A such that the user wants to prevent or block all or some trick play functions during those scenes or segments. Block E has significant action, so the system has blocked (i.e., prevents) all fast forward trick play functions, but not pause or rewind functions. An example may be a spoiler avoidance where Block F has the "I'm your father" scene, so users cannot skip to that segment from any prior segment of the video. However, if all users have watched the video thru that scene, rewinding back to it is allowed.

Note that while the word "map file" as used herein may not necessarily correspond to an actual file on permanent storage, but to any data structure in memory that allows the same functions.

Also note that the above is only an exemplary embodiment of a mapping file, and more complex structures with more complex options may be possible. A more detailed description of how a peer trick play map file is created is set forth below.

Creating Peer Trick Play Map File

The peer trick play map file construction process utilizes the results of video analysis to determine user affinity with segments within the video. The video analysis per se can be performed by a central server or peer node using techniques known in the art such as scene classification, speaker identification, annotations analysis, etc. The analysis information may be embedded in the video or obtained from a service. The user's preferences, video playback history, and profile are used to evaluate whether specific trick play functions are enabled for each video segment. In addition to users' map files, there might also be a "global" map file associated with specific content, that forbids trick play actions at, or to, certain segments. An application of this would be spoiler-avoidance, e.g., "don't skip forward to the last 10 minutes because that is where the twist is." Such a content-specific map file may be created and provided by the content creator, the content provider, the user's social network, or manually created by previous viewers of that content. An example of a more detailed version of the evaluation instruction discussed above may be as follows:

For each segment of the video:
1. Obtain the classifications of the segment.
2. Obtain user preferences for the classifications.
3. Obtain the user's playback history for previously watched segments with similar classifications.
4. Optionally, or if the user does not have enough historical data, utilize the playback history of people in the user's social network or people classified as similar to the user.
5. If the user's preferences indicate a dislike for the classifications and/or playback history indicates a high degree of avoidance trick play behavior (e.g., fast forward, skip) then record an entry in the map file for the segment indicating avoidance trick play operations are allowed.
6. If the user's preferences indicate a match for the classifications and the playback history indicate a high degree of desirability, then record an entry in the map file that allows trick play functions such as slow, rewind, etc.
7. If the data is inconclusive, record a conditional entry in the map file that allows the map file to dynamically adapt based on the user's behavior for the current viewing session.

The video content is divided into scenes by the peer node 28, content producer, social network or other means. For example, content producers often divide video content into chapters or segments which may be used for trick play mapping.

The trick play settings can be implicit or explicit as follows. With explicit or manual settings, the user selects scenes and examines the scenes explicitly and manually sets trick play preferences. Alternatively, the user explicitly describes scenes (using, for example, keywords, etc.) and the trick play actions allowed/disallowed for those scenes. During playback, the media player 18 provides controls that allow the viewer to select their desirability level for trick play events. For example, as a user starts watching an action scene, the user can use the input device 12 to select to "block skip, FF" and select that pause, rewind is acceptable.

Additionally, the viewer is provided preference controls in response to trick play requests received from another user. For example, a viewer receives a skip trick play event during the action scene and selects to "reject this and future skip events during action scenes." As another example, the user can also select "reject future skip events during scenes like this," where the system determines what kind of scene the particular scene is, and can determine affinity of future scenes.

With implicit or automatic settings, the user sets preferences for actors, scenes or genres. The system then examines annotations, close captioning, or other data or metadata associated with the video, and assigns a trick play preference based on the user preferences. For a further explanation of examining various data or metadata associated with video, see co-pending application Ser. No. 12/457,428, filed on Jun. 10, 2009, and which is incorporated herein by reference. The system may also examine the user's trick play history to determine scene preferences. For example, a user which invokes fast forward over romantic scenes would indicate to the system that the user would not object to fast forwards on romantic content, but would not desire rewinds. The system further examines user preferences and uses those preferences to find trick play preferences of others and maps them to the current content. The system then maps a preference to each video segment or scene. These preferences may include, but are not limited to, any of the following, in any combination:

1. No trick play—no trick play is allowed, at all.
2. Pause allowed.
3. Pause not allowed.
4. Fast forward allowed.
5. Fast forward not allowed.
6. Rewind allowed.
7. Rewind not allowed.

Creating Merged Trick play Map file

Figure 5:
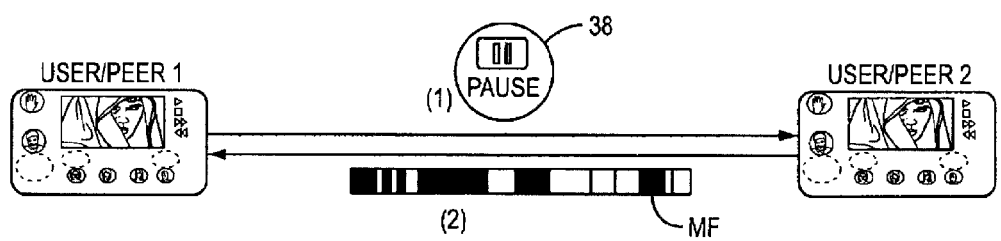
FIG. 5 depicts an example of one peer sending a pause request to another peer of a distributed video viewing group according to an illustrative embodiment.

The map file preferences file is the mechanism by which preferences are communicated to other peers. In one embodiment, the mapping file is passed on request, as shown in FIG. 5. Alternatively, a user's information (profile, preferences, semantics, history) is shared with other members of the group so they generate the user's mapping file. However, data size overhead and privacy concerns may favor the sharing of mapping files in some situations.

In FIG. 5, a requesting user/peer 1 sends a pause request 38 to another user/peer 2. The other user/peer 2 denies the request and sends the requesting user/peer 1 the mapping file MF for future reference. In yet another embodiment, the mapping files are all distributed up front to all the users/peers for a merge function to generate one mapping file for the entire distributed network.

Figure 6:
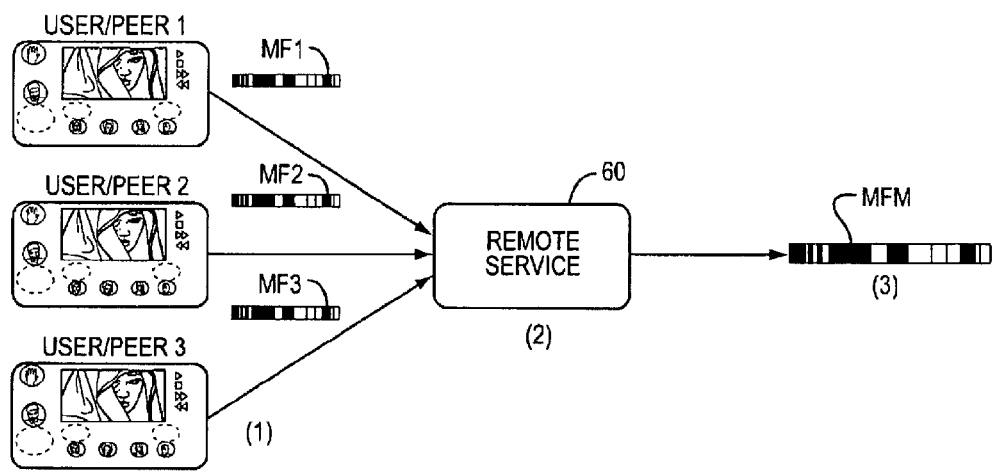
FIG. 6 depicts an example where all the peers in a distributed video viewing group network generate mapping files and pass them on to a service according to an illustrative embodiment.

In a still further embodiment, all the mapping files are passed to one peer node or remote service 60 as shown in FIG. 6. In FIG. 6, •all the peer nodes 28 and P1-Pn of the user/peers 1, 2, 3 . . . n in the network generate mapping files MF1, MF2, MF3 . . . MFn and pass that to the service 60. The service 60 may be a peer node in the distributed network (such as the controlling node), or a remote server. The service 60 merges the mapping files and generates a single mapping file or master mapping file MFM for the entire network. The service 60 passes the single, merged mapping file MFM back to the distributed network peer nodes 28 and P1-Pn. Each distributed network peer node 28 and P1-Pn can then consult the network merged mapping file MFM before making a trick play request. These embodiments are discussed in more detail below with respect to FIGS. 9-13.

The merged file MFM may be consulted before trick play is attempted. The merged file MFM may also be used to display to the users/peers what upcoming trick play functions are allowed, and who is blocking functions. Moreover, the merged map file MFM may be created simply by taking a logical-OR of the flags of the constituent map files, either for each scene, or for all scenes as a whole. Also, rather than load the entire map file, the peer nodes (or master peer or central server or whatever does the trick play resolution) may load the map file (or merged map file) piecewise into memory as the video playback progresses. The relevant piece of the map file may be determined by the current video playback offset.

Conflict resolution

Conflicts in trick play functions arise from users/peers having different preferences. For example, one user may want to allow fast forwards, but not rewinds, and another may allow rewinds, but not fast forwards.

The following mechanisms may be used for conflict resolution in any combination:

1. User rankings. Users are ranked by some order, for example, who entered the network first, who paid the larger fee, who has most time in system, etc., and that ranking is used to resolve conflicting trick play functions.
2. User voting. Users may vote on how to resolve trick play conflicts. The voting may occur before the video playback commences, before a scene where there is a conflict, or when a conflicting trick play function is invoked. Advertisements or other supplementary content may be displayed to all or some users during such "voting moments."
3. Trick Play ranking. Trick plays are ranked, such that one trick play has higher priority than another trick play. Trick play functions with lower priorities are ignored during merging.
4. Owner resolution. The owner of the system, which would generally be the person who started the session, resolves conflicts.

The resolutions may vary by video segment, and the method for resolving may be encoded in the map file, along with instructions to the peer nodes 28 and P1-Pn.

Enforcing Distributed Trick play functionality

Merged trick play files MFM may be sent to all peer nodes 28 and P1-Pn in a distributed network. Peer nodes 28 and P1-Pn enforce and advise on trick play limitations as indicated in the merged map file by at least one of blocking trick play functions which are not allowed according to map file rules, by initiating a resolution sequence as indicated by the map file (for example, initiating a vote), by displaying in the GUI (e.g., a scrub bar at the bottom or sides of the screen, chapter heading or other video segmentation) the trick play rules in a graphical manner optionally along with users in the network which have interests in the trick play rules, or by having the playback scrub bar show potential conflicts and resolution options. Even if a user's trick play action is forbidden by the map file or other users, his own media player may be allowed to perform that trick play locally. The user may then be allowed an option of synchronizing with the other users later on in some manner. Other users may be notified that this user has performed a local trick play action, and they may act on it if they want to, for instance, by going along with it.

EXAMPLE

Distributed Trick Play Resolution Using User Preferences

1. Kunal and Richard are watching a movie starring Tom Hanks and Meg Ryan using the distributed video viewing system consistent with the present invention.

2. Kunal is a big fan of Tom Hanks, but Richard really digs the romantic scenes with Meg Ryan.

3. Kunal's peer node (see, for example, peer node 28 in FIG. 1) automatically sets his trick play mapping file MF to disallow fast forwards during scenes with Tom Hanks, but pauses and rewinds are OK.

4. Richard's peer node (for example, peer node P1 in FIG. 1) automatically sets his trick play mapping file MF to disallow any trick play functions in scenes with Meg Ryan, because he wants to view them unspoiled.

5. While the movie plays, if either Kunal or Richard wishes to use a trick play function, the system will consult the merged map file MFM to determine if the trick play is allowed to allow for enjoyable watching of the movie.

Figure 7:
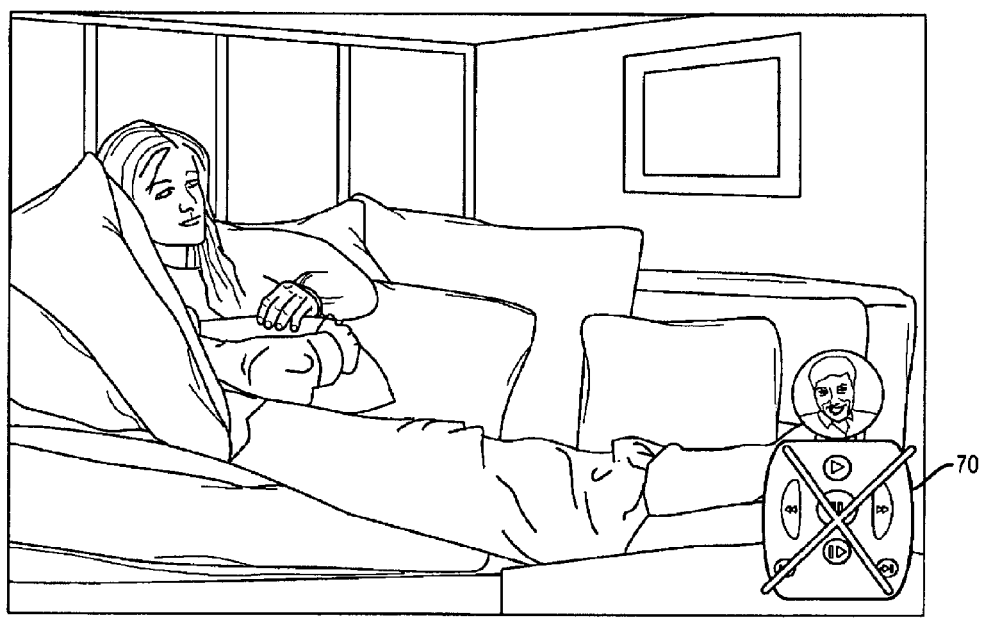
FIG. 7 depicts an example where trick play functionality is disabled according to an illustrative embodiment.

6. In a rather long Meg Ryan scene, Kunal wants to fast forward through the content, but upon trying, sees that the trick play functionality is disabled because of Richard's preferences (see FIG. 7). As shown in FIG. 7, for example, a symbolic depiction 70 of the trick play control buttons with a large "X" therethrough pops up in a corner of Kunal's display screen with a picture of Richard, thereby alerting Kunal that the trick play functionality is disabled because of Richard's preferences.

Figure 8:
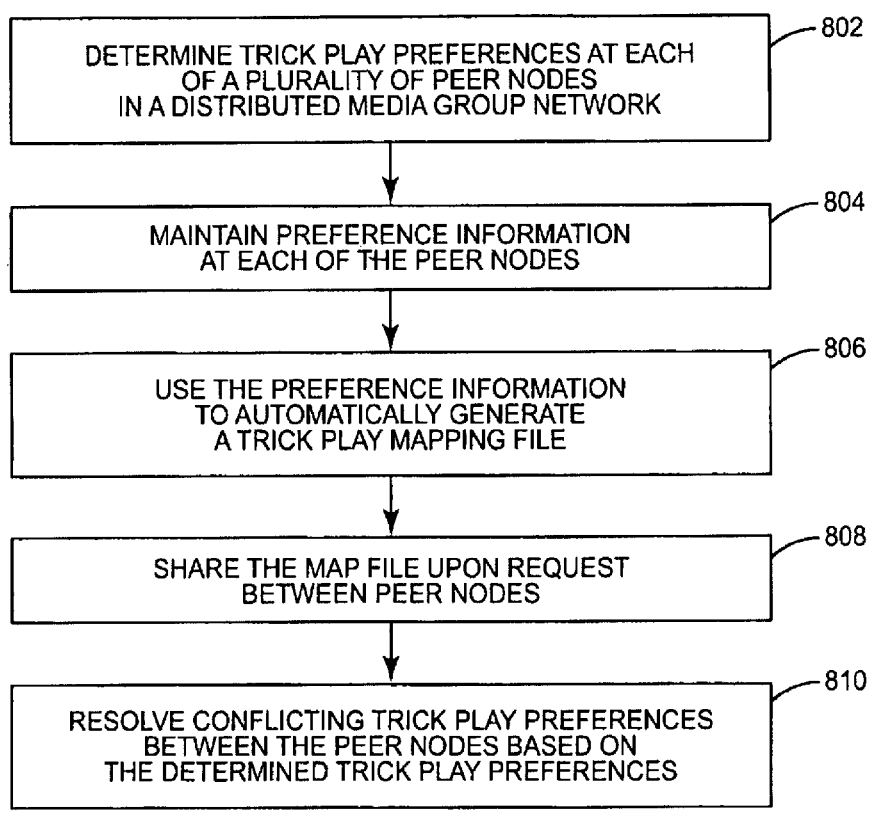
FIG. 8 depicts an illustrative embodiment of a method operating in the distributed video viewing system of FIGS. 1-7.

FIG. 8 depicts an illustrative embodiment of a method 80 operating in the distributed video viewing system. It should be understood that more or less steps may be included. In step 802, trick play preferences are determined at each of a plurality of peer nodes 28 (and see P1, P2, P3, . . . Pn in the distributed network). At step 804, each peer node maintains user preference information. This information may be used to automatically generate a trick play mapping file MF as at 806. The mapping files may be shared upon request between peer nodes as at 808. Also, as discussed above in detail, a master mapping file MFM may be created and consulted by each peer node before making a trick play request. Moreover, the master mapping file MFM can be created by each peer node, or by a remote service or server that is not a "user" peer node and may be, for example, the content server. At step 810, conflicting trick play preferences are resolved between peer nodes based on the determined trick play preferences. An individual peer node may serve as the means for determining trick play preferences and resolving conflicting trick play preferences with other peer nodes in the distributed video viewing group network based on the determined trick play preferences.

FIGS. 9 through 12B show sequence diagrams depicting exemplary use cases for various embodiments consistent with the present invention. In each use case, two trick play events are generated, one that is not allowed by the user preferences map files, as well as one that is allowed. The sequence diagrams depict how these events are handled consistent with the invention in various configurations. Note that while the trick play actions in these use cases are described as being generated by the users, the peer nodes may be configured to consult the merged map file and preemptively disallow these actions in the first place, potentially by disabling the appropriate buttons or other user-interface elements, as described previously.

Figure 9:
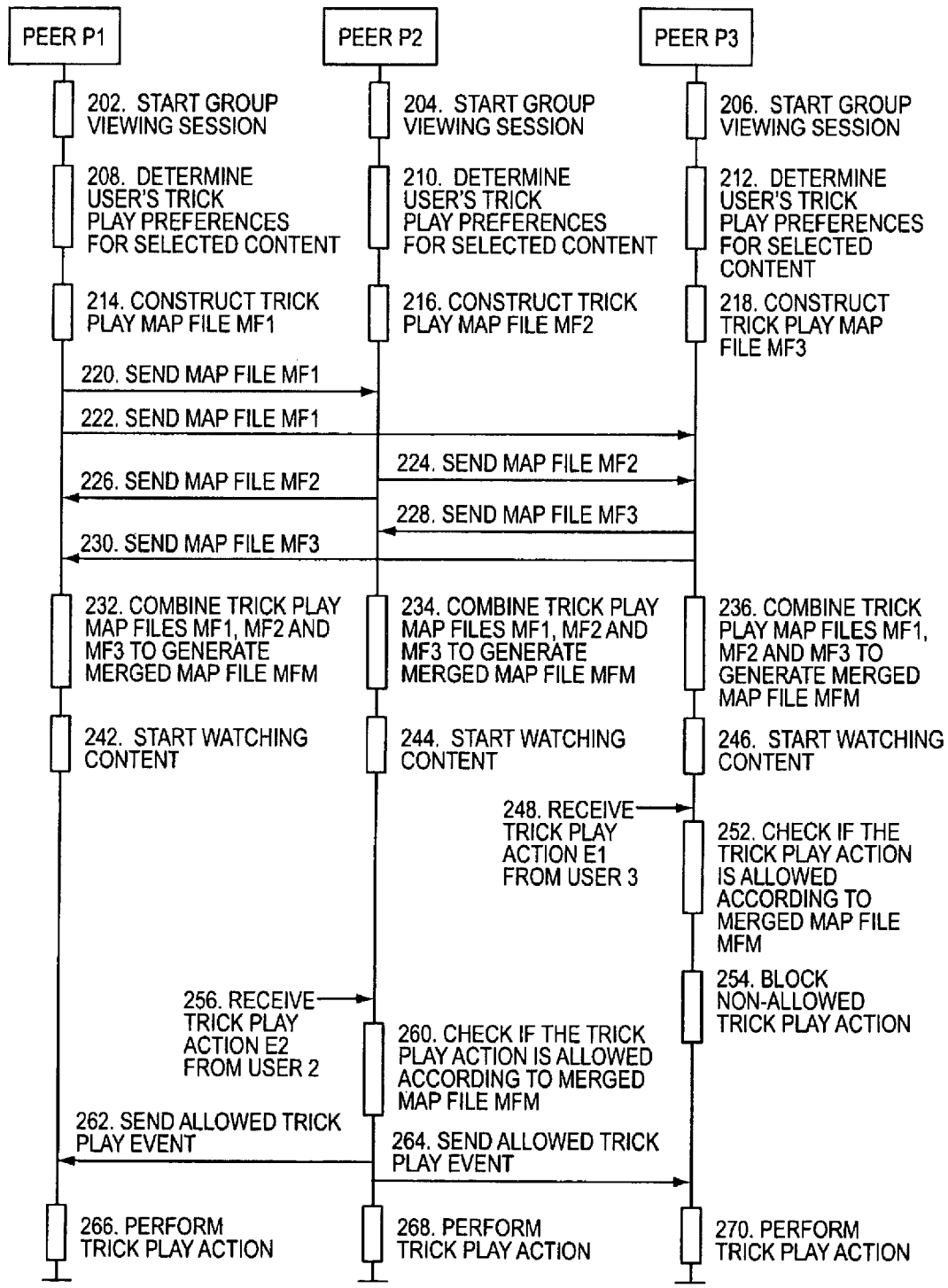
FIGS. 9-12B depict sequence diagrams of illustrative embodiments.

FIG. 9 depicts a distributed viewing group session in a purely distributed peer-to-peer configuration; that is, all peer nodes play the same roles, and no peer has more responsibilities or rights than the others. The user of peer node P1 has initiated a distributed group viewing session with peer nodes P2 and P3, for example, through a process of sending invitation messages (not shown). Peers P1, P2 and P3 start the group viewing session (steps 202, 204 and 206, respectively), which may include performing several preparatory operations, such as setting up network connections, downloading or distributing the content, and so on. Next, the peer nodes P1, P2, P3 analyze the content and content metadata of the video to be watched, along with their respective users' profiles, to determine the users' trick play preferences as described previously (steps 208, 210 and 212).

Based on this analysis, the peer nodes P1, P2, P3 construct trick play map files MF1, MF2 and MF3, respectively (steps 214, 216 and 218), describing their respective users' trick play preferences, as described in detail previously. The peer nodes then exchange their trick play map files MF1, MF2 and MF3, with each other, so that each peer node has a copy of all other peers' map files (steps 220-230). Each peer node then combines the map files MF1, MF2 and MF3 to generate a merged map file MFM, which contains the combined trick play preferences of all users (steps 232, 234, 236).

The peer nodes then start playing the content (steps 242, 244, 246), possibly in response to a play event by one or more users, or alternately when the peer nodes signal each other that they are ready. User 3 of peer node P3 then generates a trick play event E1 (step 248). Peer node P3 compares the trick play event E1 with the combined user preferences as described in the merged map file MFM at the current video playback offset (step 252). In this case, the peer node determines that the event E1 is not allowed by the merged map file MFM, and hence proceeds to block that action (step 254). Thus, an unwanted trick play action is efficiently and speedily blocked. The peer node may display a message to its user explaining why the trick play action was not allowed. If the system is so configured, it may allow the user to perform the trick play action locally without affecting the users of peer nodes P1 and P2, and let them synchronize at a later point.

Some time later, peer node P2 receives a trick play action E2 from its user (step 256). Peer Node P2 compares the trick play event E2 with the combined user preferences as described in the merged map file MFM at the current video playback offset (step 260). In this case, the trick play action is allowed. Hence, peer node P2 propagates the trick play event E2 to the peer nodes P1 and P3 (steps 262 and 264). All peer nodes, P1, P2 and P3, then perform the trick play action on the viewed content in a synchronized manner (steps 266, 268 and 270).

Various techniques well known in the art may be employed to ensure that the distributed trick play actions are performed in a synchronized manner, and that the resulting content playback at each peer is also synchronized. Note that peers P1 and P3 may compare the received trick play event with their own copies of the merged map file MFM, as well as their own map files MF1, MF2 and MF3, before trusting P2's message and performing the action (not shown). This may be necessary to protect users from malicious peers or users spamming trick play actions.

Figure 10:
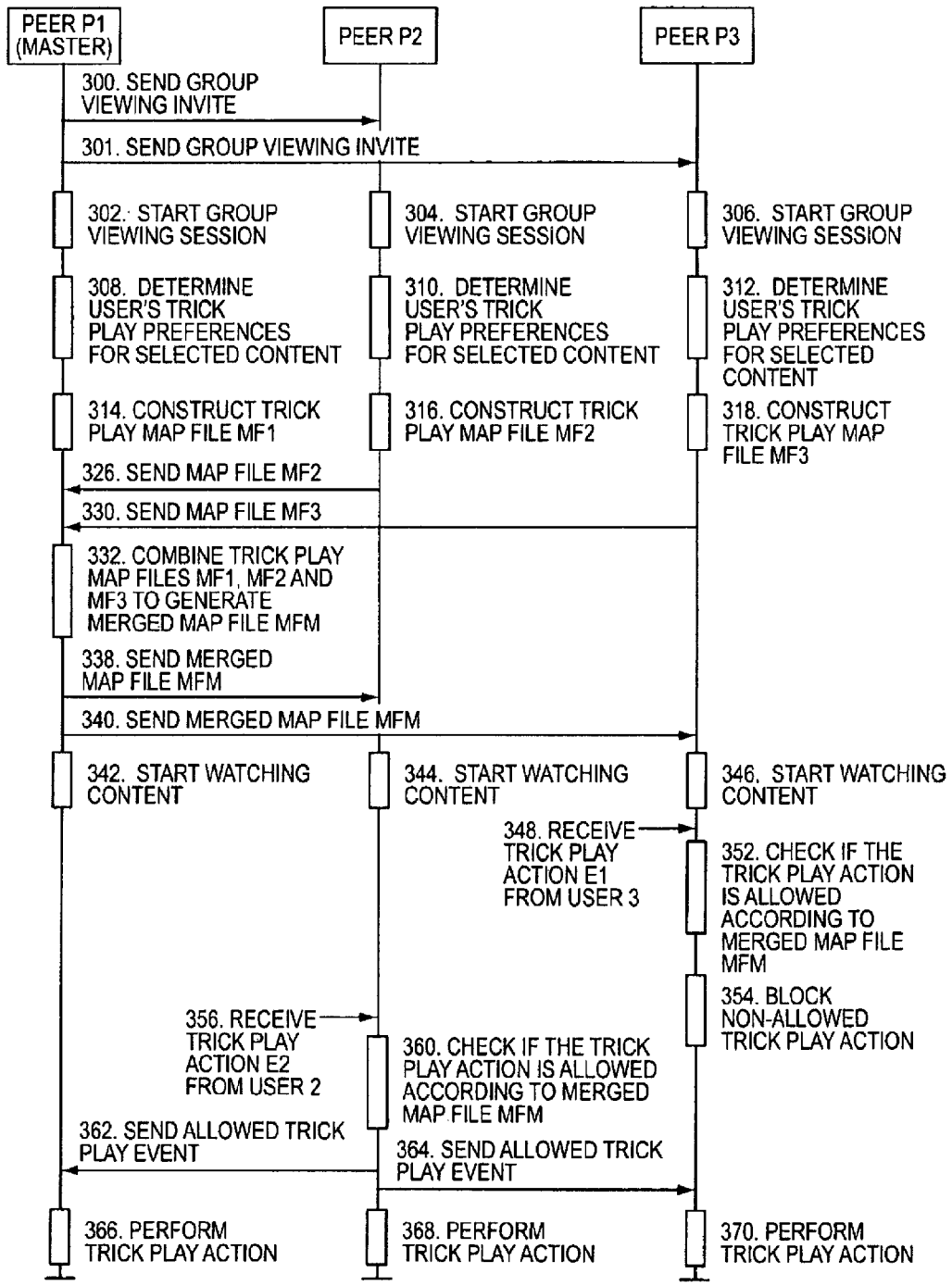

FIG. 10 depicts a distributed viewing group session in a Master/Slave peer-to-peer configuration with distributed trick play resolution; that is, one of the peer nodes (in this case, peer P1) acts as a master node, playing a more central role and having more responsibilities, and potentially rights, than the slave peer nodes (in this case, P2 and P3). However, trick play resolution is still distributed; that is, each peer node maintains a copy of the merged trick play file and consults it to authorize user trick play actions. The user of peer node P1 initiates a distributed group viewing session with peer nodes P2 and P3, for example, through a process of sending invitation messages (steps 300 and 301). Peers P1, P2 and P3 start the group viewing session (steps 302, 304 and 306 respectively), which may include performing several preparatory operations, such as setting up network connections, downloading or distributing the content, and so on. Next, the peer nodes P1, P2, P3 analyze the content and content metadata of the video to be watched, along with their respective users' profiles, to determine the users' trick play preferences as described previously (steps 308, 310 and 312).

Based on this analysis, the peer nodes P1, P2, P3 construct trick play map files MF1, MF2 and MF3, respectively (steps 314, 316 and 318), describing their respective users' trick play preferences, as described in detail previously. The peer nodes P2 and P3 then forward their trick play map files MF2 and MF3, respectively, to the master peer P1 (steps 326-330).

The master peer node P1 then combines the map files MF1, MF2 and MF3 to generate a merged map file MFM, which contains the combined trick play preferences of all users (steps 332). In addition to combining the map files, the master peer may also include other preferences or profiles, or assign higher priority to its own map file, or enable its user to examine and edit the combined trick play preferences, or any combination of these (not shown). The master peer node P1 then sends back the merged map file to the other peers P2 and P3, so that each peer node has a copy of the merged map file MFM (steps 338 and 340).

The peer nodes then start playing the content (steps 342, 344, 346), possibly in response to a play event by one or more users, or alternately when the peer nodes signal each other that they are ready. User 3 of peer node P3 then generates a trick play event E1 (step 348). Peer node P3 compares the trick play event E1 with the combined user preferences as described in the merged map file MFM at the current video playback offset (step 352). In this case, the peer node determines that the event E1 is not allowed by the merged map file MFM, and hence proceeds to block that action (step 354). Thus, an unwanted trick play action is efficiently and speedily blocked. The peer node may display a message to its user explaining why the trick play action was not allowed. If the system is so configured, it may allow the user to perform the trick play action locally without affecting the users of peer nodes P1 and P2, and let them synchronize at a later point.

Some time later, peer node P2 receives a trick play action E2 from its user (step 356). Peer node P2 compares the trick play event E2 with the combined user preferences as described in the merged map file MFM at the current video playback offset (step 360). In this case, the trick play action is allowed. Hence, peer node P2 propagates the trick play event E2 to the peer nodes P1 and P3 (steps 362 and 364). All peer nodes, P1, P2 and P3, then perform the trick play action on the viewed content in a synchronized manner (steps 366, 368 and 370).

Various techniques well known in the art may be employed to ensure that the distributed trick play actions are performed in a synchronized manner, and that the resulting content playback at each peer is also synchronized. Note that peers P1 and P3 may compare the received trick play event with their own copies of the merged map file MFM, as well as their own map files MF1, MF2 and MF3, before trusting P2's message and performing the action (not shown). This may be necessary to protect users from malicious peers or users spamming trick play actions.

Figure 11:
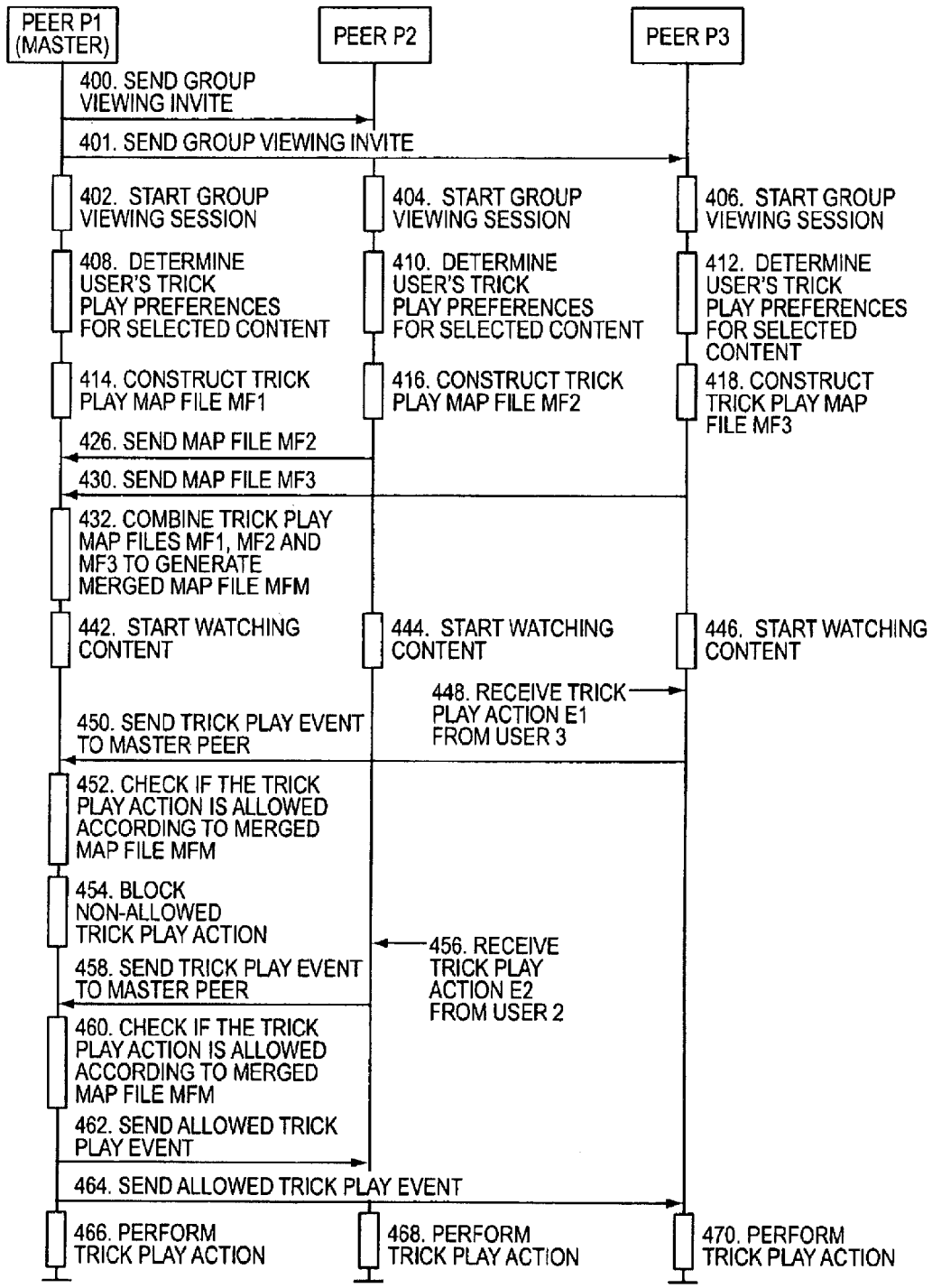

FIG. 11 depicts a distributed viewing group session in a Master/Slave peer-to-peer configuration with centralized trick play resolution; that is, one of the peer nodes (in this case, peer P1) acts as a master node, playing a more central role and having more responsibilities, and potentially rights, than the slave peer nodes (in this case, P2 and P3). In addition, trick play resolution is also performed by the master peer node P1, so that each peer node does not need to maintain a copy of the merged trick play file. Instead the slave nodes send their map files and forward trick play events to the master node, which constructs the merged map file and consults it to authorize user trick play actions. This configuration centralizes the decision making process, thus allowing more control and eliminating the complexities of distributed decision making.

The user of peer node P1 initiates a distributed group viewing session with peer nodes P2 and P3, for example, through a process of sending invitation messages (steps 400 and 401). Peers P1, P2 and P3 start the group viewing session (steps 402, 404 and 406, respectively), which may include performing several preparatory operations, such as setting up network connections, downloading or distributing the content, and so on. Next, the peer nodes P1, P2, P3 analyze the content and content metadata of the video to be watched, along with their respective users' profiles, to determine the users' trick play preferences as described previously (steps 408, 410 and 412).

Based on this analysis, the peer nodes P1, P2, P3 construct trick play map files MF1, MF2 and MF3, respectively (steps 414, 416 and 418), describing their respective users' trick play preferences, as described in detail previously. The peer nodes P2 and P3 then forward their trick play map files MF2 and MF3, respectively, to the master peer P1 (steps 426-430). The master peer node P1 then combines the map files MF1, MF2 and MF3 to generate a merged map file MFM, which contains the combined trick play preferences of all users (steps 432). In addition to combining the map files, the master peer may also include other preferences or profiles, or assign higher priority to its own map file, or enable its user to examine and edit the combined trick play preferences, or any combination of these (not shown). The master peer node P1 maintains the merged map file locally, so that the slave peer nodes P2 and P3 do not have a copy of the merged map file MFM, although optionally, the master node may share the merged map file with the slave nodes (not shown).

The peer nodes then start playing the content (steps 442, 444, 446), possibly in response to a play event by one or more users, or alternately when the peer nodes signal each other that they are ready. The user of peer node P3 then generates a trick play event E1 (step 448). Peer node P3 forwards the trick play event E1 to the master peer P1 (step 450). The master peer P1 then compares the trick play event E1 with the combined user preferences as described in the merged map file MFM at the current video playback offset (step 452). In this case, the peer node P1 determines that the event E1 is not allowed by the merged map file, MFM, and hence proceeds to block that action (step 454). Optionally, it may send a response message informing P3 that the trick play event E1 was not allowed, possibly along with an explanation (not shown). Alternately, peer node P3 may assume the lack of any response to mean that the event E1 was not allowed. The peer node P3 may display a message to its user explaining why the trick play action was not allowed. If the system is so configured, it may allow the user to perform the trick play action locally without affecting the users of peer nodes P1 and P2, and let them synchronize at a later point.

Some time later, peer node P2 receives a trick play action E2 from its user (step 456). It also forwards the trick play event E2 to the master peer P1. The master peer P1 compares the trick play event E2 with the combined user preferences as described in the merged map file MFM at the current video playback offset (step 460). In this case, the trick play action is allowed. Hence, the master peer node P1 propagates the trick play event E2 to its slave peer nodes P2 and P3 (steps 462 and 464). All peer nodes, P1, P2 and P3, then perform the trick play action on the viewed content in a synchronized manner (steps 466, 468 and 470).

Various techniques well known in the art may be employed to ensure that the distributed trick play actions are performed in a synchronized manner, and that the resulting content playback at each peer is also synchronized. Note that if the user of peer P1 generates a trick play action, being the master peer, it would not need to forward the event to any other peer, but can check it against the merged map file locally. Note also that peers P2 and P3 may compare the received trick play event with their own map files MF2 and MF3, before trusting the master peer's message and performing the action (not shown). This may be necessary to protect users from malicious peers or users spamming trick play actions.

Figure 12A:
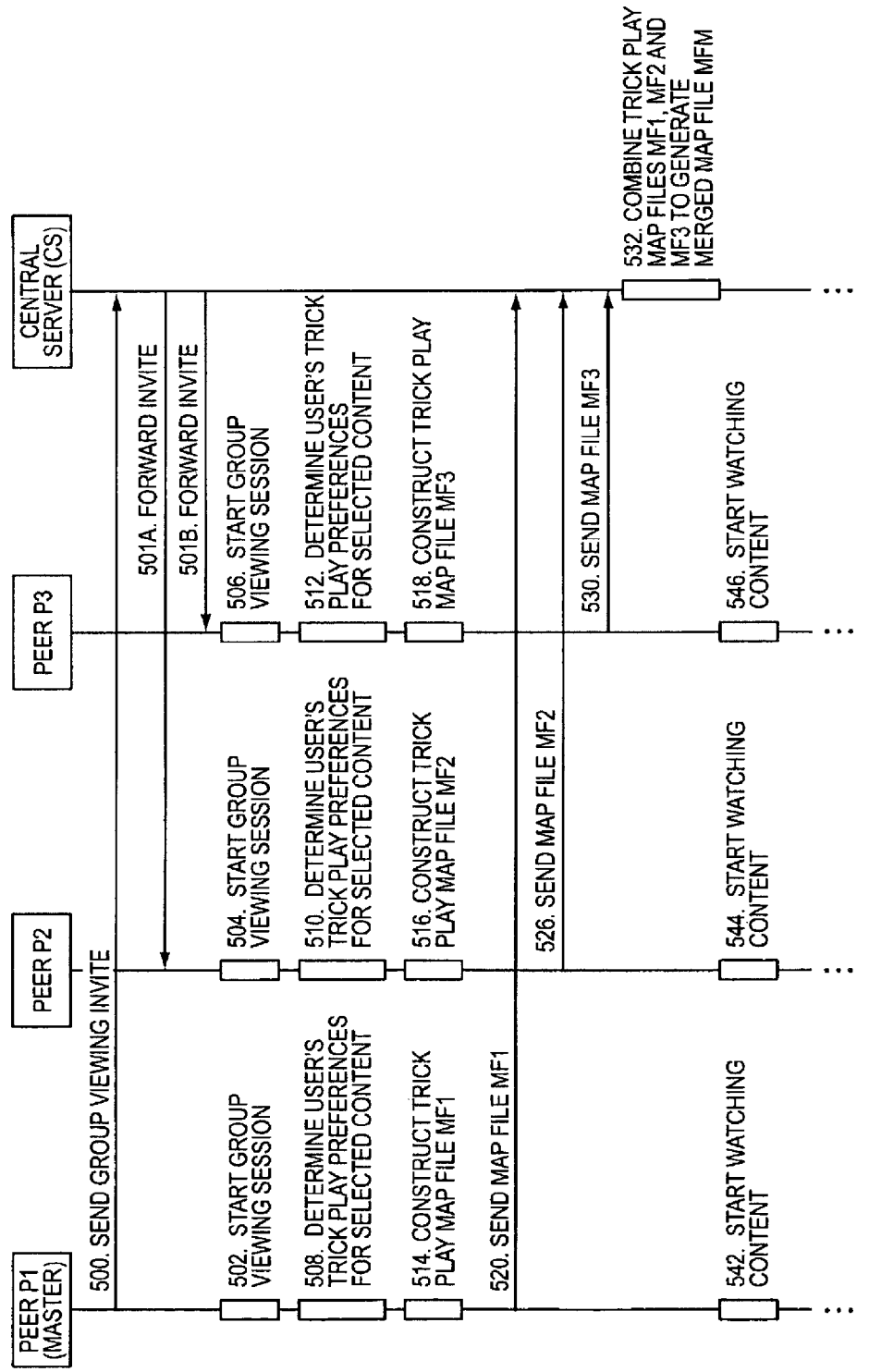
Figure 12B:
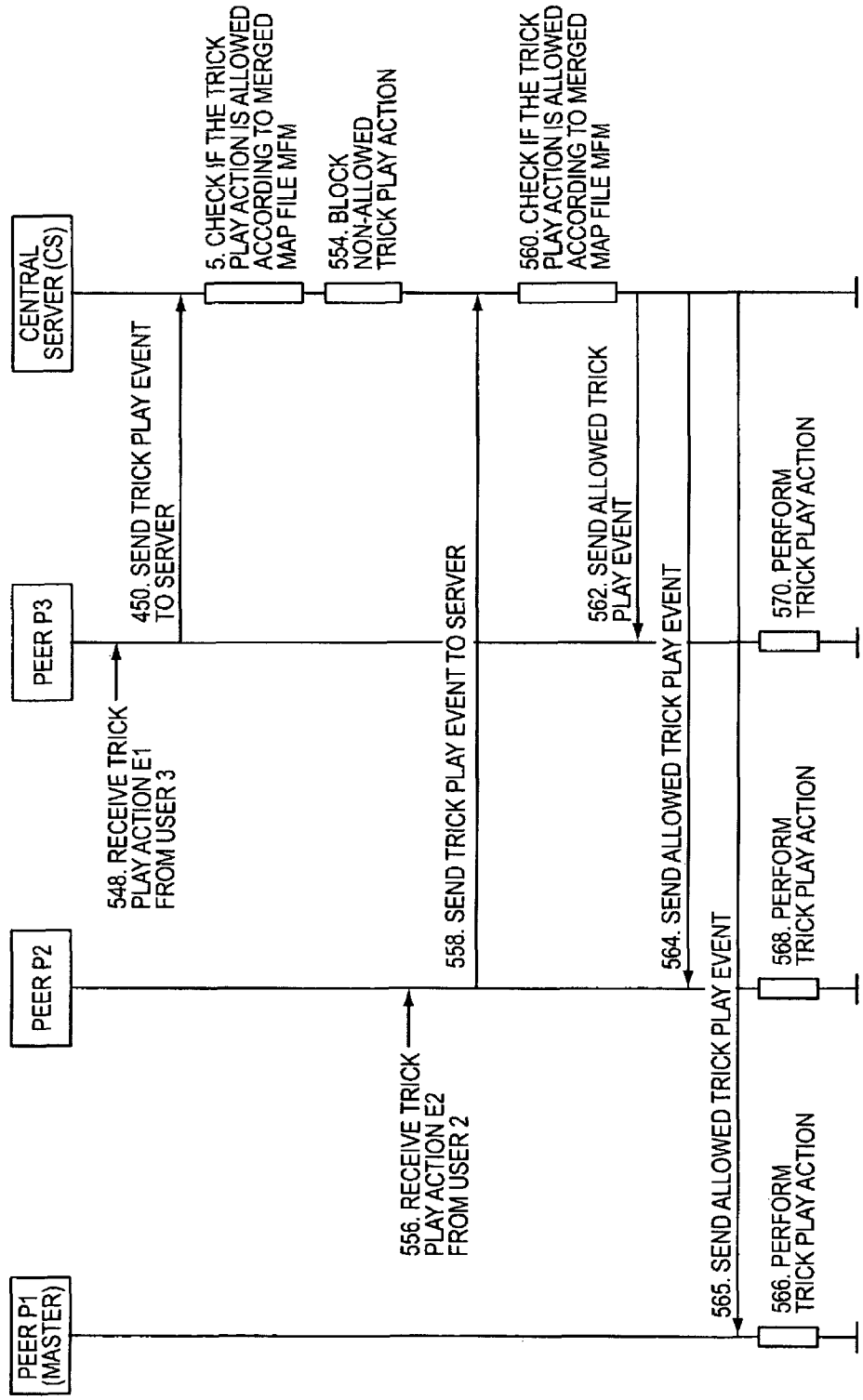

FIGS. 12A and 12B depict a distributed viewing group session in a Client/Server configuration with centralized trick play resolution; that is, all the peer nodes (P1, P2 and P3) act as clients, and a central server CS acts as the master, having more responsibilities, and potentially rights, than the client peer nodes. In addition, trick play resolution is also performed by the central server CS, so that each peer node does not need to maintain a copy of the merged trick play file. Instead the client peer nodes send their map files and forward trick play events to the central server CS, which constructs the merged map file and consults it to authorize user trick play actions. In case the content being viewed is streamed online, the central server CS may be the same as the content server. This configuration may be set up using standard web technologies, thus eliminating the need for peer-to-peer connections.

Figure 13:
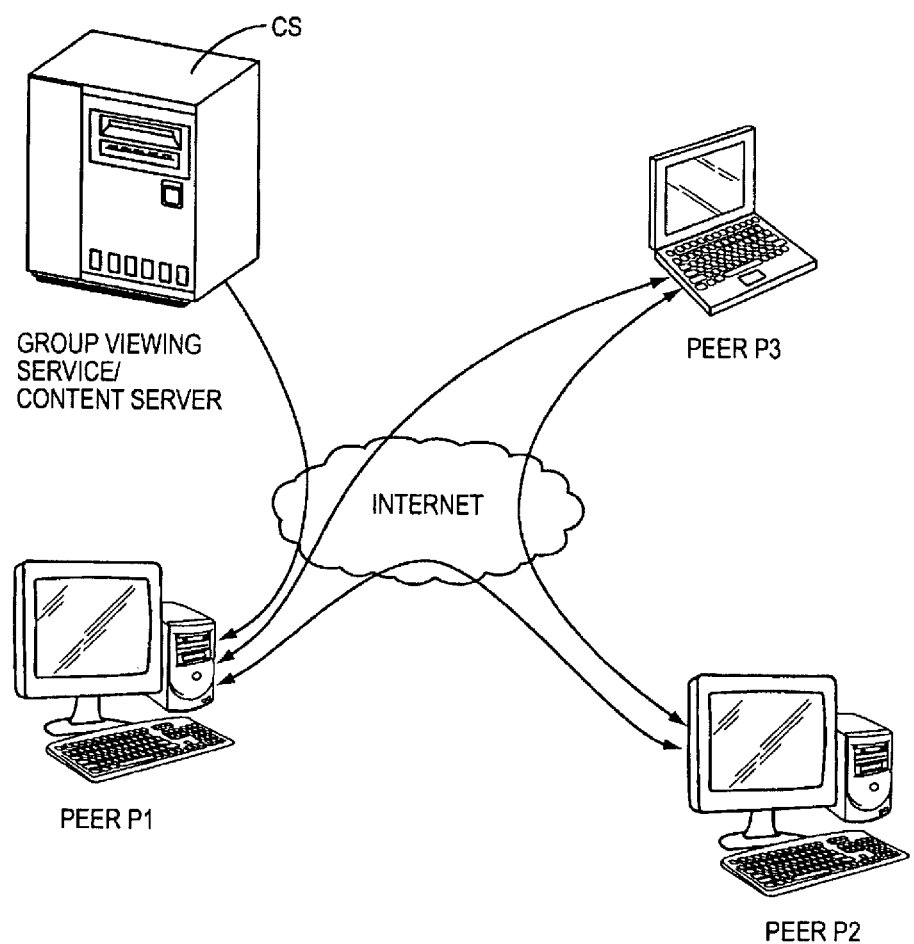
FIG. 13 depicts a network diagram of the illustrative embodiment of FIGS. 12A and 12B.

FIG. 13 depicts a network diagram of the client/server configuration shown in FIGS. 12A and 12B.

Referring to FIGS. 12A and 12B, the user of peer node P1 initiates a distributed group viewing session with peer nodes P2 and P3, for example, through a process of sending invitation message to the central server CS (step 500), which forwards it to peers P2 and P3 (steps 501a and 501b). Peers P1, P2 and P3 start the group viewing session (steps 502, 504 and 506 respectively), which may include performing several preparatory operations, such as setting up network connections, downloading or distributing the content, and so on. Next, the peer nodes P1, P2, P3 analyze the content and content metadata of the video to be watched, along with their respective users' profiles, to determine the users' trick play preferences as described previously (steps 508, 510 and 512).

Based on this analysis, the peer nodes P1, P2, P3 construct trick play map files MF1, MF2 and MF3, respectively (steps 514, 516 and 518), describing their respective users' trick play preferences, as described in detail previously. The peer nodes P1, P2 and P3 then forward their trick play map files MF1, MF2 and MF3, respectively, to the central server CS (steps 520, 526 and 530). The central server CS then combines the map files MF1, MF2 and MF3 to generate a merged map file MFM, which contains the combined trick play preferences of all users (steps 532). In addition to combining the map files, the server may also include other preferences or profiles, such as from historical information of other viewing groups that may have previously viewed the same or similar content, or enable the client peer node users to examine and edit the combined trick play preferences, or any combination of these (not shown). The central server CS maintains the merged map file locally, so that the client peer nodes P1, P2 and P3 do not need a copy of the merged map file MFM, although optionally, the central server may share the merged map file with the client peer nodes (not shown).

The peer nodes then start playing the content (steps 542, 544, 546), possibly in response to a play event by one or more users, or alternately when the peer nodes signal each other that they are ready. The user of peer node P3 then generates a trick play event E1 (step 548). Peer node P3 forwards the trick play event E1 to the central server CS (step 550). The central server CS then compares the trick play event E1 with the combined user preferences as described in the merged map file MFM at the current video playback offset (step 552). In this case, the central server CS determines that the event E1 is not allowed by the merged map file, MFM, and hence proceeds to block that action (step 554). Optionally, it may send a response message informing P3 that the trick play event E1 was not allowed, possibly along with an explanation (not shown). Alternately, peer node P3 may assume the lack of any response to mean that the event E1 was not allowed. The peer node P3 may display a message to its user explaining why the trick play action was not allowed. If the system is .so configured, it may allow the user to perform the trick play action locally without affecting the users of peer nodes P1 and P2, and let them synchronize at a later point.

Some time later, peer node P2 receives a trick play action E2 from its user (step 556). It also forwards the trick play event E2 to the central server CS (step 558). The central server CS compares the trick play event E2 with the combined user preferences as described in the merged map file MFM at the current video playback offset (step 560). In this case, the trick play action is allowed. Hence, the central server CS propagates the trick play event E2 to all its client peer nodes P1, P2 and P3 (steps 562, 564 and 565). All peer nodes, P1, P2 and P3, then perform the trick play action on the viewed content in a synchronized manner (steps 566, 568 and. 570).

Various techniques well known in the art may be employed to ensure that the distributed trick play actions are performed in a synchronized manner, and that the resulting content playback at each peer is also synchronized. Note also that peers P1 and P3 may compare the received trick play event with their own map files MF1 and MF3, before trusting the master peer's message and performing the action (not shown). This may be necessary to protect users from malicious peers or users spamming trick play actions.

Note that the above configurations are exemplary embodiments, and alternative embodiments combining various aspects of those described above may be possible. For instance, map files may not be exchanged at all initially, but on receiving trick play events from a peer node, peer nodes may compare these events against their own map files, and if not allowed, may broadcast a failure message along with the relevant portion of the map file to the other peer nodes. Thus, only portions of the map file where a conflict actually arises are exchanged. Also, disallowed trick play actions in these examples are blocked by default, and several of the alternative embodiments discussed previously, such as user voting and so on, have not been explicitly described, but may be included to work with these embodiments.

The present invention has substantial opportunity for variation without departing from the spirit or scope of the present invention. For example, while the embodiments discussed herein are directed to personal or in-home playback, the present invention is not limited thereto. Further, while the examples refer to video segments or scenes, the present invention is not limited thereto and other forms of media content are contemplated herein.

Those skilled in the art will recognize improvements and modifications to the preferred embodiments of the present invention. All such improvements and modifications are considered within the scope of the concepts disclosed herein and the claims that follow.

What is claimed is:

1. A method of distributed trick play resolution in a distributed video viewing group network, the method comprising:
   determining trick play preferences for each of a plurality of peer nodes in the distributed video viewing group network with respect to a video item;
   determining conflicting trick play preferences between the peer nodes based on one or more of a group consisting of: user rankings, user voting, trick play ranking, and owner resolution; and
   resolving the determined conflicting trick play preferences.

2. The method of claim 1, wherein the distributed media group network comprises a distributed video viewing group network and the media item comprises a video item.

3. The method of claim 2, further comprising maintaining information at each of the plurality of peer nodes, the information including one or more of a user profile, genre preferences, a content history, and semantic relationships.

4. The method of claim 3, wherein the user profile comprises at least one of demographics and account information.

5. The method of claim 3, wherein the content history comprises at least one of video content viewed, video content skipped, and video content rewound.

6. The method of claim 3, wherein the semantic relationships comprise a cache of genres and content which is semantically relevant to a user's preferences.

7. The method of claim 3, further comprising using the information maintained at each peer node to automatically generate a trick play mapping file.

8. The method of claim 7, wherein the trick play mapping file comprises a data structure that identifies a user and comprises a substructure for each scene of the video item, the substructure comprising a scene identification and trick play actions that are allowed, denied, or do not matter to the user for a particular scene.

9. The method of claim 8, wherein the mapping file generated at each peer node is distributed up front to all other peer nodes for a merge function to generate one mapping file for the entire distributed video viewing group network.

10. The method of claim 8; wherein the mapping file generated at each peer node is passed to a single peer node or a remote service, and wherein the single peer node or remote service merges all of the mapping files into a single, master mapping file for the entire distributed video viewing group network, the method further comprising passing the single, master mapping file back to the individual peer nodes, and each peer node consulting the single, master mapping file before making a trick play request.

11. The method of claim 2, wherein a user at a particular peer node selects scenes from the video item and examines the scenes explicitly and manually sets the trick play preferences.

12. The method of claim 1, wherein the trick play preferences comprise one or more of no trick play allowed at all, pause allowed, pause not allowed, fast forward allowed, fast forward not allowed, rewind allowed, and rewind not allowed.

13. A media system for trick play content resolution in a distributed video viewing group network, comprising:
a server configured to:
determine trick play preferences for each of a plurality of peer nodes in the distributed video viewing group network with respect to a video item;
determine conflicting trick play preferences between the peer nodes based on one or more of a group consisting of: user rankings, user voting, trick play ranking, and owner resolution; and
resolve the determined conflicting trick play preferences.

14. The media system of claim 13, wherein the server is configured to automatically generate a trick play mapping file.

15. The media system of claim 14, wherein the trick play mapping file comprises a data structure that identifies a user and comprises a substructure for each scene of the video item, the substructure comprising a scene identification and trick play actions that are allowed, denied, or do not matter to the user for a particular scene.

16. A media system for trick play content resolution in a distributed video viewing group network, comprising:
a peer device configured to:
determine trick play preferences for each of a plurality of peer nodes in the distributed video viewing group network with respect to a video item;
determine conflicting trick play preferences between the peer nodes based on one or more of a group consisting of: user rankings, user voting, trick play ranking, and owner resolution; and
resolve the determined conflicting trick play preferences.

17. The media system of claim 16, wherein the peer device is configured to automatically generate a trick play mapping file.

18. The media system of claim 17, wherein the trick play mapping file comprises a data structure that identifies a user and comprises a substructure for each scene of the video item, the substructure comprising a scene identification and trick play actions that are allowed, denied, or do not matter to the user for a particular scene.

19. The media system claim 17, wherein the mapping file generated by the peer node is distributed to the other peer nodes for a merge function to generate one mapping file for the entire distributed video viewing group network.

20. The media system of claim 19, wherein the mapping file generated by the peer node is passed to another single peer node or a remote service, and wherein the single peer node or remote service merges all of the mapping files from all the peer nodes into a single, master mapping file for the entire distributed video viewing group network, and wherein the single peer node or remote service passes the single, master mapping file back to the peer node, such that the peer node consults the single, master mapping file before making a trick play request.

21. A tangible computer readable medium storing a computer program, executable by a machine, for trick play content resolution in a distributed video viewing group network, the computer program comprising executable instructions for:
determining trick play preferences for each of a plurality of peer nodes in the distributed video viewing group network with respect to a video item;
determining conflicting trick play preferences between the peer nodes based on one or more of a group consisting of: user rankings, user voting, trick play ranking, and owner resolution; and
resolving the determined conflicting trick play preferences.

* * * * *